(12) United States Patent
Akasaka

(10) Patent No.: US 12,712,330 B2
(45) Date of Patent: Aug. 18, 2026

(54) OPTICAL SIGNAL AMPLIFICATION

(71) Applicant: 1FINITY Inc., Kawasaki (JP)

(72) Inventor: Youichi Akasaka, Plano, TX (US)

(73) Assignee: 1FINITY Inc., Kawasaki (JP)

( * ) Notice: Subject to any disclaimer, the term of this patent is extended or adjusted under 35 U.S.C. 154(b) by 769 days.

(21) Appl. No.: 18/101,955

(22) Filed: Jan. 26, 2023

(65) Prior Publication Data

US 2024/0258758 A1 Aug. 1, 2024

(51) Int. Cl.

| | |
|---|---|
| ***H01S 3/067*** | (2006.01) |
| ***H01S 3/10*** | (2006.01) |
| ***H01S 3/13*** | (2006.01) |
| ***H04B 10/291*** | (2013.01) |
| ***H04B 10/294*** | (2013.01) |

(52) U.S. Cl.

CPC ...... *H01S 3/06716* (2013.01); *H01S 3/10023* (2013.01); *H01S 3/13013* (2019.08); *H04B 10/2912* (2013.01); *H04B 10/2941* (2013.01); *H04B 2210/003* (2013.01)

(58) Field of Classification Search

CPC .... H01S 3/06754; H01S 3/302; H01S 3/1608; H01S 3/13013; H01S 3/06716; H01S 3/10023; H04B 10/2912

USPC ..................................................... 359/341.41

See application file for complete search history.

(56) References Cited

U.S. PATENT DOCUMENTS

| | | | | |
|---|---|---|---|---|
| 5,223,404 A * | 6/1993 | Suido | ........................ | C12Q 1/26 530/331 |
| 5,271,024 A * | 12/1993 | Huber | ..................... | H01S 3/067 372/102 |
| 5,416,864 A * | 5/1995 | Cassidy | ............. | H04B 10/2912 385/27 |
| 5,530,584 A * | 6/1996 | Myslinski | ........... | H01S 3/06754 359/337.1 |
| 10,971,888 B2 * | 4/2021 | Miura | ................... | H01S 3/0941 |
| 11,043,785 B2 * | 6/2021 | Baker | ..................... | C03C 13/04 |

* cited by examiner

*Primary Examiner* — Daniel St Cyr

(74) *Attorney, Agent, or Firm* — Maschoff Brennan

(57) ABSTRACT

An optical amplifier may include an erbium-doped fiber and an optical coupler coupled to the erbium-doped fiber. In some embodiments, a length of the erbium-doped fiber may be selected for an amplification gain applied by the optical amplifier. The optical coupler may be configured to multiplex one or more optical data signals and an optical pump signal from an optical pump onto the erbium-doped fiber such that the erbium-doped fiber may amplify a first continuous range of wavelengths of the optical data signals. The optical amplifier may further include a filter coupled to the erbium-doped fiber and configured to attenuate a second continuous range of wavelengths. In some embodiments, the second continuous range may be less than the first continuous range and positioned within the first continuous range.

15 Claims, 6 Drawing Sheets

Obtain an optical signal and an optical pump signal — 402

Multiplex the optical signal and the optical pump signal, by an optical coupler, onto an erbium-doped fiber configured to amplify a first continuous range of wavelengths of the optical signal, a length of the erbium-doped fiber selected for a desired amplification gain — 404

After multiplexing the optical signal and the optical pump signal onto the erbium-doped fiber, attenuate a second continuous range of wavelengths of the optical signal, the second continuous range being less than the first continuous range and positioned within the first continuous range — 406

*FIG. 4*

OPTICAL SIGNAL AMPLIFICATION

FIELD

The embodiments discussed in the present disclosure are related to optical signal amplification.

BACKGROUND

An optical network may use optical signals to transmit data between a transmitter and a receiver. The optical signals may be transmitted along optical fibers. As optical signals traverse optical fibers, a power level of the optical signals may decrease. As such, optical amplifiers may be used to compensate for the loss of an optical fiber in optical communication.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

In an example embodiment, an optical amplifier may include an erbium-doped fiber and an optical coupler coupled to the erbium-doped fiber. In some embodiments, a length of the erbium-doped fiber may be selected for an amplification gain applied by the optical amplifier. The optical coupler may be configured to multiplex one or more optical data signals and an optical pump signal from an optical pump onto the erbium-doped fiber such that the erbium-doped fiber may amplify a first continuous range of wavelengths of the optical data signal. The optical amplifier may further include a filter coupled to the erbium-doped fiber and configured to attenuate a second continuous range of wavelengths. In some embodiments, the second continuous range may be less than the first continuous range and positioned within the first continuous range.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which:

FIG. 4 illustrates a flowchart of an example method of optical signal amplification;

DESCRIPTION OF EMBODIMENTS

Optical amplifiers may be used in optical networks to compensate for fiber loss in the optical networks. One type of optical amplifier may include optical fiber amplifiers. Optical fiber amplifiers may be doped with a material that may result in a gain being applied to an optical signal when the optical signal passes through the optical fiber, thereby amplifying the optical signal. As an example, a material that may be used in optical fiber amplifiers may be erbium or some other material.

In some circumstance, optical fiber amplifiers may have a varying gain effect on different wavelengths of an optical signal. For example, an optical fiber amplifier may apply a gain above a first threshold for a first range of wavelengths and a gain below the first threshold for a second range of wavelengths outside the first range of wavelengths. For example, an optical fiber amplifier may apply a gain in a conventional band (C-band) which ranges from 1520 to 1565 nm above a first threshold and apply a gain below the first threshold in a short-wavelength band (S-band) and a long-wavelength band (L-band) which range from 1495 nm to 1520 nm and 1565 nm to 1600 nm, respectively.

In some circumstances, systems may fully utilize a first range of wavelengths and thus expansion to other wavelengths may be desired. However, a gain applied by the optical fiber amplifier to the other wavelengths may not be sufficient for a system. For example, in an optical fiber amplifier, the gain applied to the other wavelengths may be limited such that the optical fiber amplifier may not be able to improve a signal to noise ratio for the other wavelengths given a gain applied to noise in the first range of wavelengths. Thus, the optical fiber amplifier may not be effective as a solution for a system.

Some embodiments in this disclosure may relate to an optical fiber amplifier that may be configured to amplify optical signals in the other wavelengths while attenuating noise signals generated in the first range of wavelengths. By attenuating the noise signal generated in the first range of wavelengths, an optical signal to noise ratio of the optical signals in the other wavelengths may be increased. Furthermore, the optical fiber amplifier may be configured to simultaneously amplify wavelengths both larger and smaller than the wavelengths in the first range. For example, an optical fiber amplifier according to the present disclosure may amplify optical signals in both the S-band and L-band. As a result, optical fiber amplifier according to the present disclosure may provide amplification for optical signals in the S-band, L-band, and the C-band.

Figure 1:
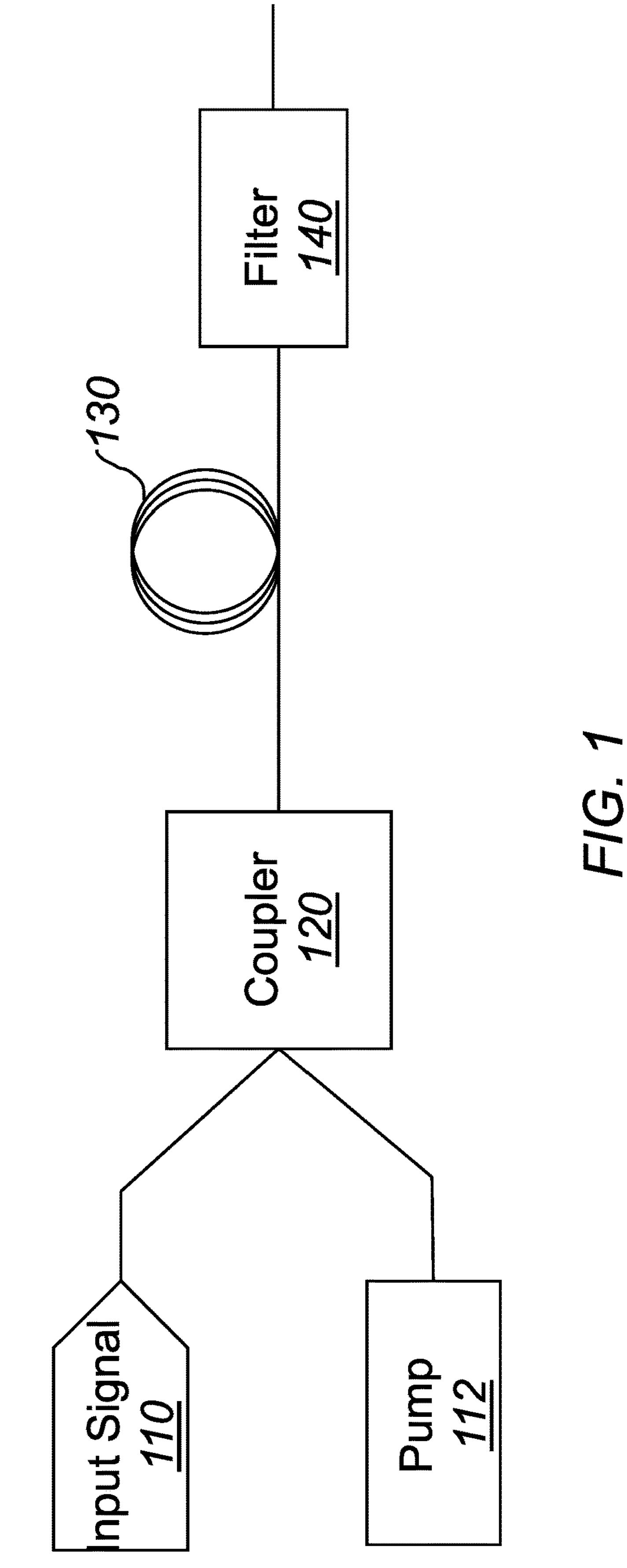
FIG. 1 illustrates a block diagram of an example optical amplifier.

Turning to the figures, FIG. 1 illustrates an example optical amplifier 100, arranged in accordance with at least some embodiments described herein. The optical amplifier 100 may include an optical pump 112, an optical coupler 120, an optical fiber 130, and a filter 140. In general, the optical amplifier 100 may be configured to apply a gain to an optical input signal 110. For example, the optical amplifier 100 may be configured to amplify or apply a positive gain to the optical input signal 110.

In some embodiments, the optical amplifier 100 may be configured to obtain the optical input signal 110 and provide the optical input signal 110 to the optical coupler 120. The optical input signal 110 may be obtained from another device or system, such as an optical transmitter, optical fiber, or some other optical component that may be used in an optical network, such as another optical amplifier. In some embodiments, the optical input signal 110 may include data modulated onto the optical input signal 110. Thus, the optical input signal 110 may be an optical data signal.

In some embodiments, the optical input signal 110 may include a wavelength that may be amplified by the optical amplifier 100 and in particular the optical fiber 130. For example, the optical fiber 130 may be configured to amplify a first continuous range of wavelengths. In these and other embodiments, the optical input signal 110 may include a wavelength that is within the first continuous range of wavelengths. For example, the optical input signal 110 may include wavelengths in S-band, L-band, and/or C-band.

Alternately or additionally, the optical input signal 110 may include a wavelength outside of a second continuous range of wavelengths within the first continuous range of wavelengths. Thus, the optical input signal 110 may include a wavelength that is part of a first portion of the first continuous range of wavelengths or a second portion of the first continuous range of wavelengths where the first portion and the second portion are not adjacent portions of the first continuous range of wavelengths. For example, the first continuous range of wavelengths may range from 1460 to 1625 nm. In these and other embodiments, the second continuous range of wavelengths may range from 1530 to 1565 nm. As such, the optical input signal 110 may include a wavelength within a range from 1460 to 1530 nm and/or from 1565 to 1625 nm.

Following the above example, the optical input signal 110 may not include wavelengths in the conventional band (C-band) of optical signals with wavelengths that range from 1530 to 1565 nm. Furthermore, the optical input signal 110 may include wavelengths in the short band (S-band) of optical signals with wavelengths that range from 1460 to 1530 nm and/or the long band (L-band) of optical signals with wavelengths that range from 1565 to 1625 nm. Alternately or additionally, the optical input signal 110 may include wavelengths in the C-band, the S-band, and/or the L-band.

In some embodiments, the optical pump 112 may be optically coupled to the optical coupler 120. In these and other embodiments, the optical pump 112 may be configured to generate an optical pump signal and to provide the optical pump signal to the optical coupler 120. In some embodiments, any type of optical pump may be used. For example, the optical pump 112 may be a laser diode, an arc lamp, or a flash lamp. The optical pump signal may include a wavelength different than the wavelengths of the optical input signal 110. In these and other embodiments, the optical pump signal may not include any wavelength that is used by the optical input signal 110. In some embodiments, the wavelength of the optical pump signal may be selected based on the optical fiber 130, such as a length, material of the optical fiber 130, or doping material of the optical fiber 130, among other characteristic of the optical fiber 130.

In some embodiments, the optical coupler 120 may be optically coupled to the optical pump 112 and the optical fiber 130. In these and other embodiments, the optical coupler 120 may be optically coupled between the optical pump 112 and the optical fiber 130. The optical coupler 120 may be configured to obtain and to multiplex optical signals. For example, the optical coupler 120 may be configured to obtain the optical input signal 110 and the optical pump signal and to multiplex or combine the optical input signal 110 and the optical pump signal. As an example, the optical coupler 120 may be a wavelength division multiplexer (WDM). Alternately or additionally, the optical coupler 120 may include one or more optical components, fused optical fibers, or waveguides to multiplex the optical input signal 110 and the optical pump signal. The optical coupler 120 may provide the multiplexed optical signal to the optical fiber 130.

In some embodiments, the optical fiber 130 may be optically coupled between the optical coupler 120 and the filter 140. The optical fiber 130 may be configured to obtain the multiplexed optical signal from the optical coupler 120. The optical fiber 130 may be further configured to amplify the optical input signal 110 in response to obtaining the multiplexed optical signal from the optical coupler 120. For example, the optical fiber 130 may use energy from the optical pump signal to amplify the optical input signal 110. Alternately or additionally, the optical fiber 130 may use energy from the optical pump signal to amplify or apply a gain to the first continuous range of wavelengths. For example, the optical fiber 130 may provide amplification via stimulated emission where the optical pump signal may excite ions of the optical fiber 130. The excited ions may be motivated to an intermediate state, which then decays back to the ground state while emitting light. The emitted light may have wavelengths within the first continuous range of wavelengths, including wavelengths included in the optical input signal 110. The emitted light may thus combine with the optical input signal 110 to amplify the optical input signal 110. The optical fiber 130 may output an amplified optical signal.

In some embodiments, the optical fiber 130 may be a doped optical fiber. The doping of the optical fiber 130 may adjust the wavelengths of the light emitted by the optical fiber 130. In these and other embodiments, the optical fiber 130 may be doped with erbium, neodymium, holmium, or some other or some of material. As an example, the optical fiber 130 may be doped with erbium. The optical fiber 130 doped with erbium may generally allow stimulated emission in the 1500 to 1600 nm range.

Figure 2A:
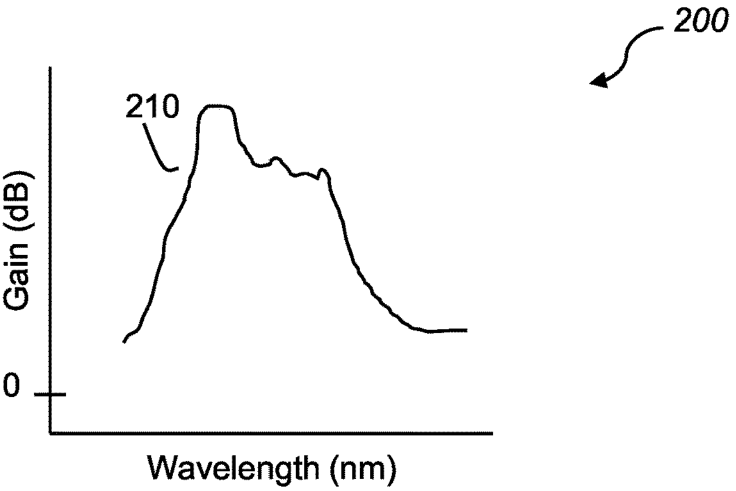
FIG. 2A illustrates an example gain curve of a single-stage optical amplifier.

In some embodiments, an amount of gain the optical fiber 130 applies to an optical signal with a wavelength within the first continuous range of wavelengths may vary depending on the wavelength of the optical signal. For example, FIG. 2A illustrates a diagram 200 of an example gain curve 210 of the optical fiber 130, according to at least one embodiment in the present disclosure. The gain curve 210 may illustrate the amount of gain applied to the first continuous range of wavelengths by the optical fiber 130. In some embodiments, the highest gain amounts may be applied to the optical input signal 110 with wavelengths near the center of the gain curve 210. Thus, the gain curve 210 may have the highest gain amount in a second continuous range of wavelengths near the center of the gain curve 210. In these and other embodiments, an amount of gain applied by the optical fiber 130 to the optical input signal 110 with wavelengths near the edges of the gain curve 210 may be represented by fringes of the gain curve 210 and may be less than the gain applied to the second continuous range of wavelengths. In these and other embodiments, the optical input signal 110 with wavelengths near the edges of the gain curve 210 may include wavelengths in the first portion and the second portion of the first continuous range of wavelengths amplified by the optical fiber 130. As an example, the gain curve 210 may represent varying gain amounts applied by the optical fiber 130 over the 1500 to 1600 nm wavelength range. The second continuous range of wavelengths may range from 1530 to 1565 nm range. The first portion and the second portion of the first continuous range of wavelengths may correspond to 1500 to 1530 nm and 1565 to 1600 nm.

As a result of the first portion and the second portion of the first continuous range of wavelengths and the second continuous range of wavelengths experiencing different gain amounts, an optical signal with wavelengths in the second continuous range of wavelengths may have a higher signal to noise ratio than an optical signal with wavelengths outside of the second continuous range of wavelengths after amplification by the optical fiber 130.

Returning to the discussion of FIG. 1, in some embodiments, the filter 140 may be optically coupled to the optical fiber 130. In these and other embodiments, the filter 140 may obtain the amplified optical signal from the optical fiber 130 and be configured to filter the amplified optical signal. In these and other embodiments, the filter 140 may reduce unwanted noise of the amplified optical signal. Alternately or additionally, the filter 140 may be configured to adjust the gain curve of the optical fiber 130 with respect to the gains applied to the wavelengths in the first continuous range of wavelengths. For example, the filter 140 may make the gain curve of the optical fiber flatter. For example, the filter 140 may reduce a gain of the second continuous range of wavelengths such that the overall gain of the second continuous range of wavelengths is more similar to the gain of the other portions of the first continuous range of wavelengths.

In some embodiments, an optical input signal amplified by the optical amplifier 100 may include wavelengths in the second continuous range of wavelengths. In these and other embodiments, the filter 140 may reduce the gain of the optical input signal and the noise level in the second continuous range of wavelengths. By reducing the noise in the second continuous range of wavelengths, the signal to noise ratio of optical input signals with wavelengths outside of the second continuous range of wavelengths may be improved.

Figure 2B:
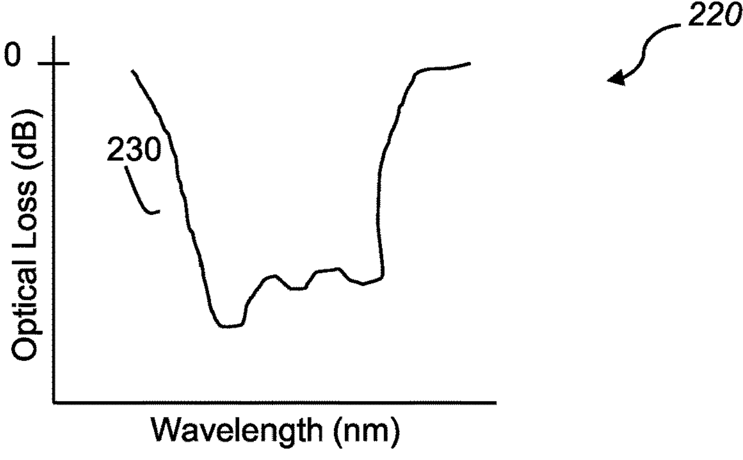
FIG. 2B illustrates an example loss curve of a filter.

For example, FIG. 2B illustrates a diagram 220 of an example loss curve 230 of the filter 140, according to at least one embodiment of the present disclosure. The loss curve 230 may illustrate an amount of filtering applied by the filter 140 to the first continuous range of wavelengths. In some embodiments, the loss curve 230 may have a shape that is approximately opposite of the gain curve 210 of FIG. 2A. For example, the loss curve 230 may have a loss that flattens the gain curve of the optical fiber 130. For example, the loss curve may have a loss that is equal to the gain amount of the gain curve above the gain applied to the wavelengths outside of the second continuous range of wavelengths. For example, the optical fiber 130 may apply a gain curve such that the wavelengths outside of the second continuous range of wavelengths have a 10 dB gain applied and wavelengths in the second continuous range of wavelengths have a 30 dB gain applied. In these and other embodiments, the loss curve 230 may have a 20 dB loss applied to the wavelengths in the second continuous range of wavelengths. As a result, an overall gain applied by the optical amplifier 100 to all of the wavelengths within the first continuous range of wavelengths may be 10 dB.

Figure 2C:
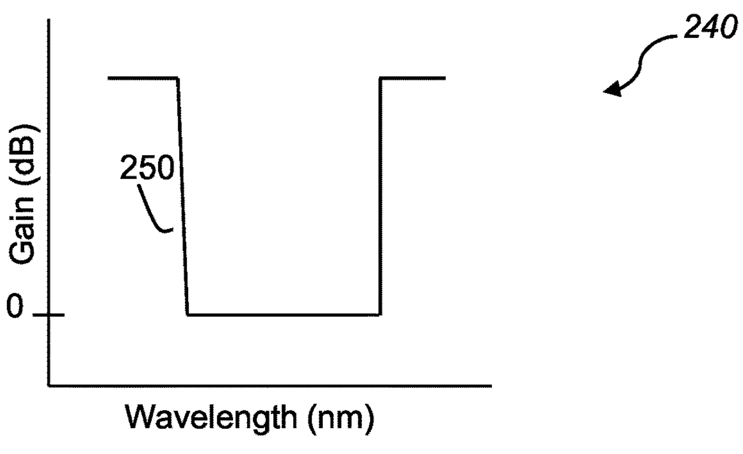
FIG. 2C illustrates an example gain curve of a single-stage optical amplifier after applying a filter.

Alternately or additionally, loss curve 230 may fully counteract the gain curve 210 for the second continuous range of wavelengths when the optical input signal 110 does not include a wavelength within the second continuous range of wavelengths. For example, the optical fiber 130 may apply a gain curve such that the wavelengths outside of the second continuous range of wavelengths have a 10 dB gain applied and wavelengths in the second continuous range of wavelengths have a 30 dB gain applied. In these and other embodiments, the loss curve 230 may have a 30 dB loss applied to the wavelengths in the second continuous range of wavelengths. As a result, an overall gain applied by the optical amplifier 100 to the second continuous range of wavelengths may be zero and to wavelengths outside of the second continuous range of wavelengths may be 10 dB. For example, FIG. 2C illustrates a diagram 240 of an example gain curve 250 of the optical amplifier 100 post-filtering by the filter 140. The second gain curve 250 may illustrate a similar gain across fringes of the second gain curve 250 which may correspond with wavelengths in the optical input signal 110. The second gain curve 250 may also illustrate minimal gain across the second continuous range of wavelengths.

As an example, the filter 140 may attenuate wavelengths within the C-band of optical signals with wavelengths that range from 1530 to 1565 nm.

In some embodiments, the optical amplifier 100 may be used in any optical network and in multiple different locations within the optical network. For example, the optical network may be configured as a point-to-point optical network, a ring optical network, a mesh optical network, or any other optical network or combination of networks. The optical network may be a short-haul network, a long-haul network, or any other optical network or combination of optical networks. In these and other embodiments, the optical input signal 110 may include optical signals at 1460 to 1530 nm and 1565 to 1625 nm wavelengths. The optical input signal 110 may be multiplexed by the optical coupler 120 with an optical pump signal from the optical pump 112. In these and other embodiments, the optical pump signal may be at 980 nm wavelength.

The optical coupler 120 may multiplex the optical input signal 110 and the optical pump signal onto the optical fiber 130. The optical fiber 130 may include any suitable type of optical fiber, such as, Single-Mode Fiber (SMF), Enhanced Large Effective Area Fiber (E-LEAF), Dispersion Compensating Fiber (DCF), Multi-Mode Fiber (MMF), among others, as well as combinations thereof. The optical fiber 130 may amplify the optical input signal 110 in response to the optical pump signal stimulating emission from ions of the optical fiber 130. The optical fiber 130 may amplify optical signals with 1460 to 1625 nm wavelengths. The optical fiber 130 may also amplify any noise at 1460 to 1625 nm wavelengths. The optical fiber 130 may apply different gain amounts to optical signals at different wavelength according to a gain curve of the optical fiber 130. The amplified optical signal may be filtered by the filter 140. The filter 140 may include a loss curve that may counteract the gain curve of the optical fiber 130. For example, the loss curve may counteract the gain amount applied to wavelengths from 1530 to 1565 nm to attenuate noise thereby increasing the signal to noise ratio of optical signals at wavelengths outside of 1530 to 1565 nm. Thus, the optical amplifier 100 may amplify signals at 1460 to 1530 nm and 1565 to 1625 nm wavelengths simultaneously.

In some embodiments, the optical input signal 110 may include optical signals in wavelengths across the 1460 to 1625 nm range. In these embodiments, the optical input signal 110 may be amplified by the optical fiber 130 and attenuated by the filter 140 so that the optical input signal 110 has adequate gain across wavelengths of the 1460 to 1625 nm range.

Figure 3:
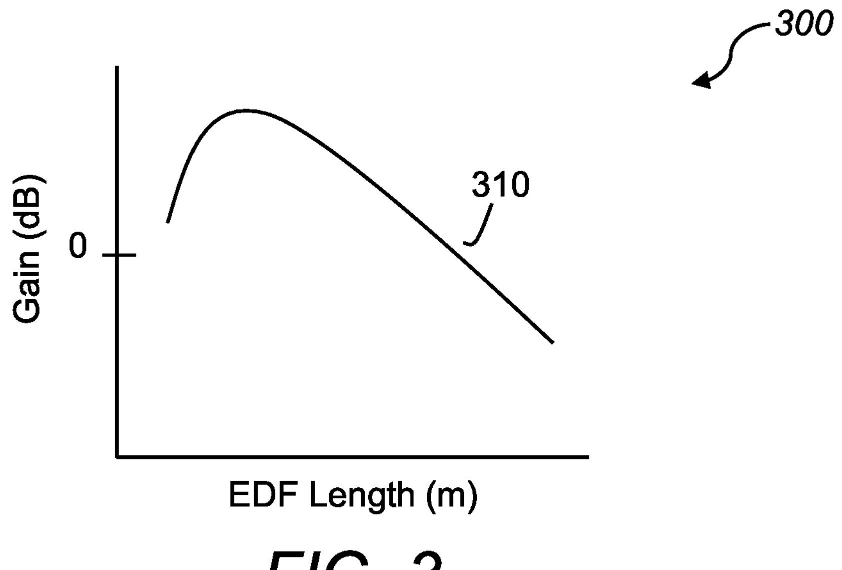
FIG. 3 illustrates a relationship between fiber length and amplification gain.

Performance of the optical amplifier 100 may depend on various parameters. For example, the performance of the optical amplifier 100 may depend on a length of the optical fiber 130, wavelength of the optical pump signal, a power of the optical pump, and a number of the optical fiber 130 used, among others, as well as combinations thereof. In particular, an amount of gain applied to the first continuous range of wavelengths may be adjusted by the length of the optical fiber 130. As the length of the optical fiber 130 changes, the amount of gain applied to the first continuous range of wavelengths by the optical fiber 130 may also change. For example, for an initial increase in the length of the optical fiber 130, an increase in the amount of gain applied may occur. In these and other embodiments, for additional increases in the length of the optical fiber 130, a decrease in the amount of gain applied may occur. For example, FIG. 3 illustrates an example of a relationship between the length of the optical fiber 130 and the amount of gain applied by the optical fiber 130. A curve line 310 may illustrate a change in gain applied by the optical fiber 130 as the length of the optical fiber 130 changes. As illustrated in FIG. 3, there exists a maximum gain in a particular length or a range of lengths of the optical fiber 130. When the length of the optical fiber 130 is shorter or longer than the particular length of the optical fiber 130, the gain may decrease.

Because of such relationship between the length of the optical fiber 130 and the amount of gain applied by the optical fiber 130, an amount of gain that may be applied to the optical input signal 110 may be limited. In particular, the gain applied by an optical input signal 110 with wavelengths in the first portion and the second portion of the first continuous range of wavelengths may be limited due to the gain curve of the optical fiber 130. As exemplified in FIG. 2A, the gain curve of the optical fiber 130 may be low in fringes of the gain curve 210. In some embodiments, the first portion and the second portion of the first continuous range of wavelength may be in the fringes of the gain curve. Thus, a maximum amount of gain that may be applied to the optical input signal 110 may be relatively low. To achieve a desired gain output of an optical signal with the limited gain to be applied by the optical fiber 130, multiple optical amplifiers such as the optical amplifier 100 may be cascaded. For example, the optical amplifier 100 may be followed by another optical amplifier that is similar to the optical amplifier 100. For example, the input signal 110 of optical amplifier in a cascade of optical amplifiers may be an output of a previous optical amplifier based on the coupler of a second optical amplifier being coupled to a filter of a first optical amplifier.

In some embodiments, a number of cascaded optical amplifiers to cascade together may depend on the particular gain to be achieved. As an example, the optical amplifier 100 may provide a gain of 10 dB to an optical input signal 110 when the particular gain for a system may be 20 dB gain. In these and other embodiments, two of the optical amplifiers 100 may be cascaded to provide a total gain of 20 dB gain to the optical input signal 110. While cascaded optical amplifiers may provide higher gains than just one optical amplifier, noise present in the optical input signal 110 may also be amplified. Thus, the filter 140 may be configured to reduce noise after each amplification by each optical fiber. For example, the filter 140 may reduce a level of noise present in the second continuous range to help increase a signal to noise ratio of optical signals in the first portion and the second portion of the first continuous range. In a cascaded arrangement, attenuated optical signals may become a second optical input signal for a second optical amplifier following a first optical amplifier. The second optical input signal may be multiplexed, by a second optical coupler, with a second optical pump signal from a second optical pump onto a second optical fiber. The second optical fiber may be configured to amplify the first continuous range of wavelengths of optical signals. The second optical fiber may be coupled to a second filter which may be configured to attenuate the second continuous range of wavelengths. In these and other embodiments, these steps may be repeated for multiple optical amplifiers according to the desired gain amount.

In some embodiments, a length of one or more of the optical fibers in cascaded optical amplifiers may be selected based on a particular gain to be applied to an optical signal. The selection may be based on the particular gain, the gain curve of the optical fibers according to length, and a number of optical amplifiers cascaded. For example, for a gain curve of optical fibers that varies between 2 and 10 dB and a particular gain of 24 dB, there are multiple different configurations of optical amplifiers. For example, eight optical amplifiers with optical fibers lengths with a gain of 3 dB may be used. As another example, two optical amplifiers with optical fibers lengths with a gain of 10 dB may be used and a third optical amplifier with an optical fiber length with a gain of 4 dB may be used. Alternately or additionally, three optical amplifiers with optical fibers lengths with a gain of 10 dB may be used to provide additional overhead. Selection of the number optical amplifiers to cascade and a length of the optical fibers in each optical amplifier may vary and may be based on the factors above as well as other factors, such as characteristics of the optical network that includes the cascaded optical amplifiers.

In some embodiments, based on a characteristic of a filter and a gain curve of the optical fiber in an optical amplifier, one or more optical amplifiers in a cascade of optical amplifiers may not include a filter. For example, if a gain curve applies a gain of 10 dB to the first and second portions of the first continuous range of wavelengths and a gain of 20 dB to the second continuous range of wavelengths and use of a filter with 20 dB of attenuation, then to achieve a gain of 20 dB across the first continuous range of wavelengths, the first optical amplifier may include a filter and the second optical amplifier may not include the filter such that the first continuous range of wavelengths has a 20 dB gain applied.

Modifications, additions, or omissions may be made to the optical amplifier 100 without departing from the scope of the present disclosure. For example, in some embodiments, the optical amplifier 100 may include a pump reflector. The pump reflector may be coupled between the optical fiber 130 and the filter 140. The pump reflector may be configured to redirect residual of the optical pump signal to the optical fiber 130 to enhance amplification by the optical fiber 130. For example, as the optical pump signal moves through the optical fiber 130, the optical pump signal may not be fully utilized by the optical fiber 130. The pump reflector may reflect back an un-utilized part of the optical pump signal which may be further absorbed by the optical fiber 130. Reflection by the pump reflector may allow more constant absorption of the optical pump signal by the optical fiber 130 as well as a more gradual decrease in the absorption of the optical pump signal by the optical fiber 130.

In some embodiments, the optical amplifier 100 may include an isolator. The isolator may be coupled between the optical coupler 120 and the optical fiber 130. The isolator may be configured to prevent optical signals from passing to the optical coupler 120 from the optical fiber 130. For example, as the pump reflector reflects back the residual part of the optical pump signal to the optical fiber 130, the reflected optical pump signal may travel along the optical fiber 130 toward the coupler 120. The isolator may prevent the reflected optical pump signal from reaching the optical coupler 120. Utilizing a pump reflector and an isolator may allow the optical fiber 130 to absorb more of the optical pump signal.

FIG. 4 illustrates a flowchart of an example method 400 of optical signal amplification. The method 400 may be arranged in accordance with at least one embodiment described in the present disclosure. One or more operations of the method 400 may be performed, in some embodiments, by a device or a system, such as the optical amplifier 100 of FIG. 1 or another device, combination of devices, system, or systems. In these and other embodiments, one or more of the steps or none of the steps of the method 400 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 400 may begin at block 402, where an optical signal and an optical pump signal may be obtained. At block 404, the optical signal and the optical pump signal may be multiplexed, by an optical coupler, onto an optical fiber. The optical fiber may be configured to amplify a first continuous range of wavelengths of optical signal. In some embodiments, a length of the optical fiber may be selected for a desired amplification gain. In some embodiments, the first continuous range of wavelengths may include wavelengths within the S-band, the C-band and the L-band of optical transmission bands. In some embodiments, the optical signals to be amplified may include a first optical signal with a wavelength within the S-band of optical transmission and a second optical signal with a wavelength within the L-band of optical transmission. For example, the optical fiber 130 may amplify the first signal within the S-band and the second optical signal within the L-band at a same time. Alternately or additionally, the optical signals to be amplified may include a first optical signal with a wavelength within the S-band of optical transmission, a second optical signal with a wavelength within the L-band of optical transmission, and a third optical signal with a wavelength within the C-band of optical transmission. For example, the optical fiber 130 may amplify the first signal within the S-band, the second optical signal within the L-band, and the third optical signal within the C-band in overlapping time periods such as at the same time. In some embodiments, the optical fiber may be doped with erbium, neodymium, holmium, or some other type of material.

At block 406, after multiplexing the optical signal and the optical pump signal on the optical fiber, a second continuous range of wavelengths of the optical signal may be attenuated. In some embodiments, the second continuous range of wavelengths may be less than the first continuous range of wavelengths and positioned within the first continuous range of wavelengths. For example, the second continuous range of wavelengths may include wavelengths within the C-band of optical transmission bands.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, the method 400 may further include, before attenuating the second continuous range of optical signal, redirecting residual of the optical pump signal back onto the optical fiber. Alternately or additionally, the method 400 may further include, after multiplexing the optical signal and the optical pump signal, preventing optical signals from passing to the optical coupler from the optical fiber.

As another example, the method 400 may further include after attenuating the second continuous range of wavelengths, multiplexing a second optical pump signal and the attenuated optical signal onto a second optical fiber configured to amplify the first continuous range of wavelengths of optical signal. In some embodiments, a length of the second optical fiber may be selected for a second desired amplification gain. In some embodiments, the method 400 may further include, after multiplexing the attenuated optical signal and the optical pump signal onto the second optical fiber, attenuating the second continuous range of wavelengths of the attenuated optical signal. In some embodiments, the second optical pump signal may be reflected back to the second optical fiber.

Figure 5:
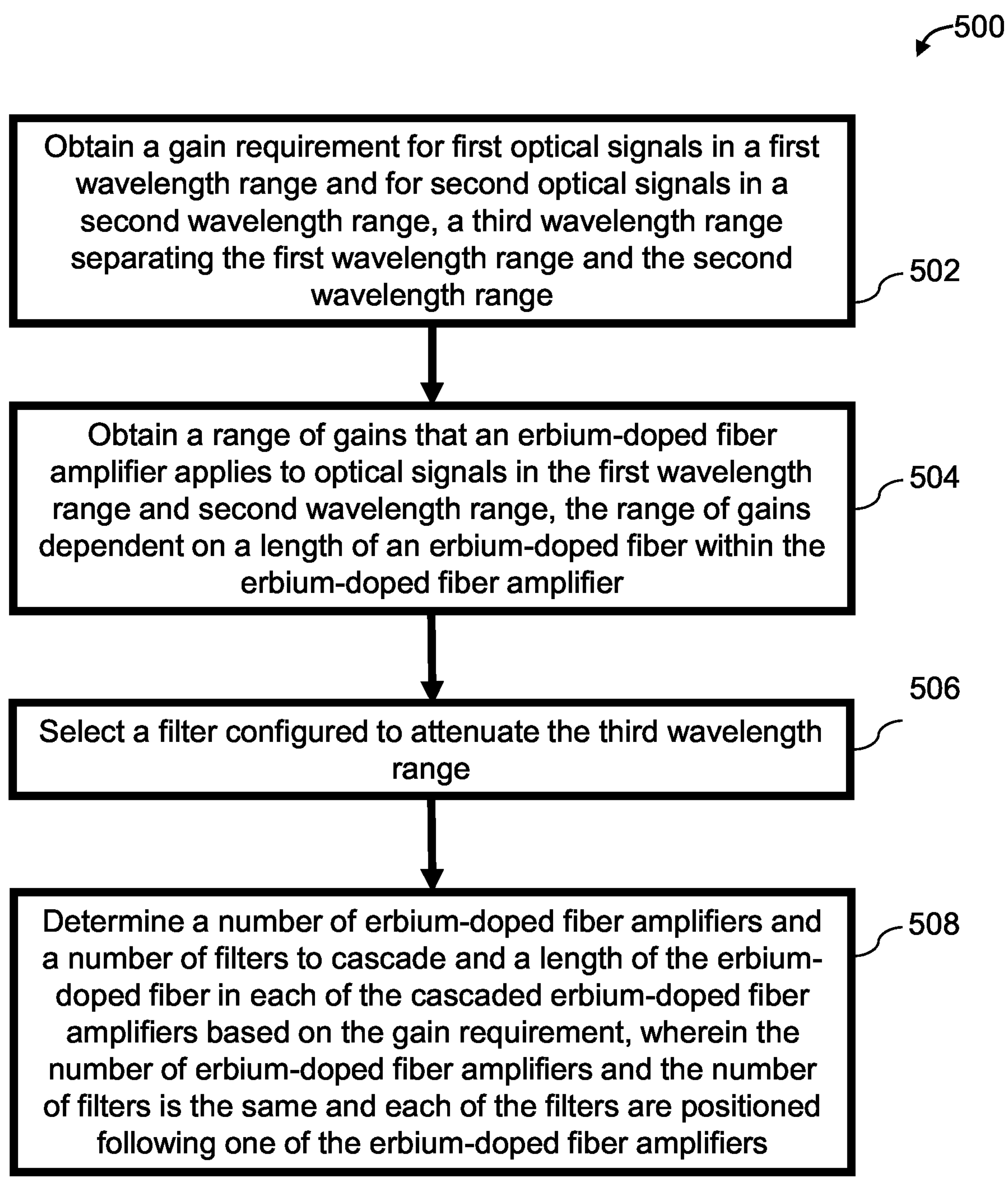
FIG. 5 illustrates a flowchart of an example method of designing an optical amplifier.

FIG. 5 illustrates a flowchart of an example method 500 of designing an optical amplifier. The method 500 may be arranged in accordance with at least one embodiment described in the present disclosure. In these and other embodiments, one or more of the steps or none of the steps of the method 500 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method may begin at block 502, where a gain requirement may be obtained for first optical signals in a first wavelength and for second optical signals in a second wavelength range. In some embodiments, a third wavelength range may separate the first wavelength range and the second wavelength range. In some embodiments, the first wavelength range may include wavelengths within the S-band and the second wavelength range may include wavelengths within the L-band. In these and other embodiments, the third wavelength range may include wavelengths within the C-band.

At block 504, a range of gains that an optical fiber amplifier applies to optical signals in the first wavelength range and second wavelength range may be obtained. In some embodiments, the range of gains may depend on a length of an optical fiber within the optical fiber amplifier. In some embodiments, the optical fiber may be doped with erbium, neodymium, holmium, or some other or some of material. For example, the optical fiber amplifier may be an erbium-doped optical fiber.

At block 506, a filter configured to attenuate the third wavelength range may be selected. In some embodiments, the filter may be selected based on a gain curve of the optical fiber within the optical fiber amplifier. For example, the filter may be selected to reduce noise and/or to produce a flatter gain across a broad range of wavelengths.

At block 508, a number of optical fiber amplifiers, a number of filters to cascade, and the length of the optical fiber may be determined based on the gain requirement. In some embodiments, the number of optical fiber amplifiers and the number of filters may be the same and each of the filers may be positioned following one of the optical fiber amplifiers.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, the method 500 may further include after obtaining the gain requirement for the first optical signals and determining a wavelength of an optical pump signal. The optical pump signal may include a wavelength different than the wavelengths of the first optical signals. In these and other embodiments, the optical pump signal may not include any wavelength that is used by the first optical signals and the second optical signals.

Figure 6:
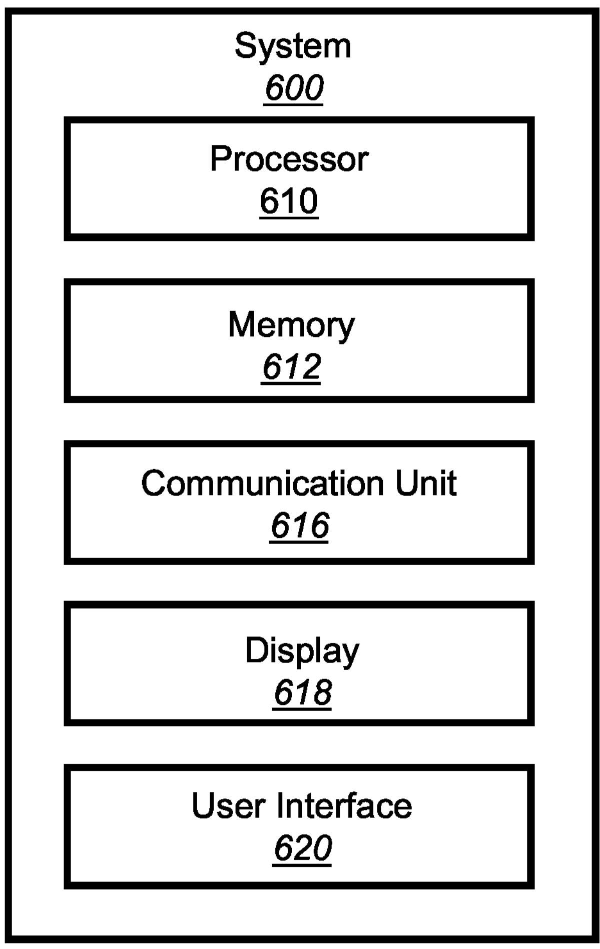
FIG. 6 illustrates an example system that may be used for optical signal amplification.

FIG. 6 is a block diagram illustrating an example system 600 that may be used for optical signal amplification, according to at least one embodiment of the present disclosure. The system 600 may include a processor 610, memory 612, a communication unit 616, a display 618, and a user interface unit 620, which all may be communicatively coupled. In some embodiments, the system 600 may be used to perform one or more of the methods described in this disclosure.

For example, the system 600 may be used to assist in the performance of the method described in FIG. 5. For example, the system 600 may be used to determine a number of optical fiber amplifiers to cascade, a number of filters to cascade, and the length of the optical fiber in each of the amplifiers.

Generally, the processor 610 may include any suitable special-purpose or general-purpose computer, computing entity, or processing device including various computer hardware or software modules and may be configured to execute instructions stored on any applicable computer-readable storage media. For example, the processor 610 may include a microprocessor, a microcontroller, a parallel processor such as a graphics processing unit (GPU) or tensor processing unit (TPU), a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 6, it is understood that the processor 610 may include any number of processors distributed across any number of networks or physical locations that are configured to perform individually or collectively any number of operations described herein. In some embodiments, the processor 610 may interpret and/or execute program instructions and/or process data stored in the memory 612. In some embodiments, the processor 610 may execute the program instructions stored in the memory 612.

For example, in some embodiments, the processor 610 may execute program instructions stored in the memory 612 that are related to task execution such that the system 600 may perform or direct the performance of the operations associated therewith as directed by the instructions. In these and other embodiments, the instructions may be used to perform one or more blocks of method 500 of FIG. 5.

The memory 612 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 610.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media.

Computer-executable instructions may include, for example, instructions and data configured to cause the processor 610 to perform a certain operation or group of operations as described in this disclosure. In these and other embodiments, the term "non-transitory" as explained in the present disclosure should be construed to exclude only those types of transitory media that were found to fall outside the scope of patentable subject matter in the Federal Circuit decision of In re Nuijten, 500 F.3d 1346 (Fed. Cir. 2007). Combinations of the above may also be included within the scope of computer-readable media.

The communication unit 616 may include any component, device, system, or combination thereof that is configured to transmit or receive information over a network. In some embodiments, the communication unit 616 may communicate with other devices at other locations, the same location, or even other components within the same system. For example, the communication unit 616 may include a modem, a network card (wireless or wired), an infrared communication device, a wireless communication device (such as an antenna), and/or chipset (such as a Bluetooth® device, an 802.6 device (e.g., Metropolitan Area Network (MAN)), a WiFi device, a WiMax device, cellular communication facilities, etc.), and/or the like. The communication unit 616 may permit data to be exchanged with a network and/or any other devices or systems described in the present disclosure.

The display 618 may be configured as one or more displays, like an LCD, LED, Braille terminal, or other type of display. The display 618 may be configured to present video, text captions, user interfaces, and other data as directed by the processor 610.

The user interface unit 620 may include any device to allow a user to interface with the system 600. For example, the user interface unit 620 may include a mouse, a track pad, a keyboard, buttons, camera, and/or a touchscreen, among other devices. The user interface unit 620 may receive input from a user and provide the input to the processor 610. In some embodiments, the user interface unit 620 and the display 618 may be combined.

Modifications, additions, or omissions may be made to the system 600 without departing from the scope of the present disclosure. For example, in some embodiments, the system 600 may include any number of other components that may not be explicitly illustrated or described. Further, depending on certain implementations, the system 600 may not include one or more of the components illustrated and described.

As indicated above, the embodiments described herein may include the use of a special purpose or general-purpose computer (e.g., the processor 610 of FIG. 6) including various computer hardware or software modules, as discussed in greater detail below. Further, as indicated above, embodiments described herein may be implemented using computer-readable media (e.g., the memory 612 of FIG. 6)

for carrying or having computer-executable instructions or data structures stored thereon.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

The invention claimed is:

1. An optical amplifier comprising:

an erbium-doped fiber including a first end and a second end and configured to amplify a first continuous range of wavelengths of optical signals, a length of the erbium-doped fiber selected for an amplification gain applied by the optical amplifier, wherein the first continuous range of wavelengths includes wavelengths within the S-band, the C-band, and the L-band of optical transmission bands;

an optical pump configured to output an optical pump signal;

an optical coupler coupled to the optical pump and the first end of the erbium-doped fiber, the optical coupler configured to multiplex one or more optical data signals and the optical pump signal onto the erbium-doped fiber; and a filter coupled to the second end of the erbium-doped fiber, the filter configured to attenuate a second continuous range of wavelengths, the second continuous range being less than the first continuous range and positioned within the first continuous range, wherein the second continuous range includes wavelengths within the C-band of optical transmission bands.

2. The optical amplifier of claim 1, wherein the optical signals to be amplified by the optical amplifier include a first optical signal with a wavelength within the S-band of optical transmission and a second optical signal with a wavelength within the L-band of optical transmission.

3. The optical amplifier of claim 2, wherein the first optical signal with the wavelength within the S-band and the second optical signal with the wavelength within the L-band pass through the optical amplifier at a same time and are both amplified by the optical amplifier.

4. The optical amplifier of claim 1, further comprising:

a second erbium-doped fiber configured to amplify the first continuous range of wavelengths of optical signals, a length of the second erbium-doped fiber selected for the amplification gain applied by the optical amplifier;

a second optical pump configured to output a second optical pump signal;

a second optical coupler coupled between the filter and the second erbium-doped fiber and configured to multiplex the optical signals and the second optical pump signal onto the second erbium-doped fiber; and a second filter coupled to the second erbium-doped fiber, the second filter configured to attenuate the second continuous range of wavelengths.

5. The optical amplifier of claim 1, further comprising an isolator coupled between the optical coupler and the first end of the erbium-doped fiber, the isolator configured to prevent optical signals from passing to the optical coupler from the erbium-doped fiber.

6. The optical amplifier of claim 1, further comprising a pump reflector coupled between the second end of the erbium-doped fiber and the filter, the pump reflector configured to redirect the optical pump signal back to the erbium-doped fiber.

7. A method to amplify a signal comprising:

obtaining an optical signal and an optical pump signal;

multiplexing, by an optical coupler, the optical signal and the optical pump signal onto an erbium-doped fiber configured to amplify a first continuous range of wavelengths of the optical signal, a length of the erbium-doped fiber selected for a desired amplification gain, wherein the first continuous range of wavelengths includes wavelengths within the S-band, the C-band and the L-band of optical transmission bands; and after multiplexing the optical signal and the optical pump signal onto the erbium-doped fiber, attenuating a second continuous range of wavelengths of the optical signal, the second continuous range being less than the first continuous range and positioned within the first continuous range, wherein the second continuous range includes wavelengths within the C-band of optical transmission bands.

8. The method to amplify a signal of claim 7, wherein the optical signal to be amplified include a first optical signal with a wavelength within the S-band of optical transmission and a second optical signal with a wavelength within the L-band of optical transmission.

9. The method to amplify a signal of claim 8, wherein the first optical signal with the wavelength within the S-band and the second optical signal within the L-band pass get amplified at a same time.

10. The method to amplify a signal of claim 7, further comprising preventing optical signals from passing to the optical coupler from the erbium-doped fiber.

11. The method to amplify a signal of claim 7, further comprising:

after attenuating the second continuous range of wavelengths: multiplexing a second optical pump signal and the attenuated optical signals onto a second erbium-doped fiber configured to amplify the first continuous range of wavelengths of optical signal, a length of the second erbium-doped fiber selected for a second desired amplification gain; and after multiplexing the attenuated optical signals and the optical pump signal onto the erbium-doped fiber, attenuating the second continuous range of wavelengths of the attenuated optical signals.

12. The method to amplify a signal of claim 11, further comprising redirecting the second optical pump signal back to the second erbium-doped fiber.

13. A method to design an optical amplifier, the method comprising:

obtaining a gain requirement for first optical signals in a first wavelength range and for second optical signals in a second wavelength range, a third wavelength range separating the first wavelength range and the second wavelength range;

obtaining a range of gains that an erbium-doped fiber amplifier applies to optical signals in the first wavelength range and second wavelength range, the range of gains dependent on a length of an erbium-doped fiber within the erbium-doped fiber amplifier;

selecting a filter configured to attenuate the third wavelength range; and determining a number of erbium-doped fiber amplifiers and a number of filters to cascade and a length of the erbium-doped fiber in each of the cascaded erbium-doped fiber amplifiers based on the gain requirement, wherein the number of erbium-doped fiber amplifiers and the number of filters is the same and each of the filters are positioned following one of the erbium-doped fiber amplifiers, wherein the first wavelength range includes wavelengths within the S-band, the second wavelength range includes wavelengths within the L-band, and the third wavelength range includes wavelengths within the C-band.

14. The method to design the optical amplifier of claim 13, further comprising after obtaining the gain requirement for the first optical signals, determining a wavelength of an optical pump signal.

15. The method to design the optical amplifier of claim 13, wherein selecting the filter is based on a gain curve of the erbium-doped fiber.

* * * * *